April 7, 1942.   L. W. WILLIAMS   2,278,603
FILTER
Filed Nov. 13, 1939   2 Sheets-Sheet 2
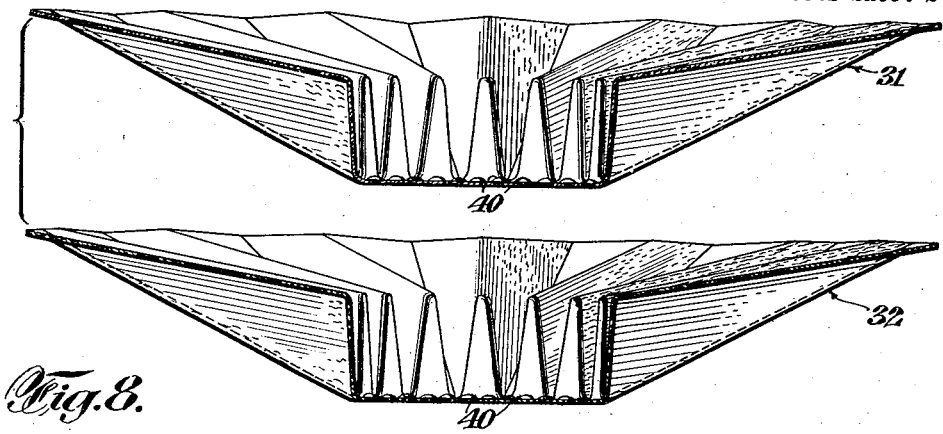
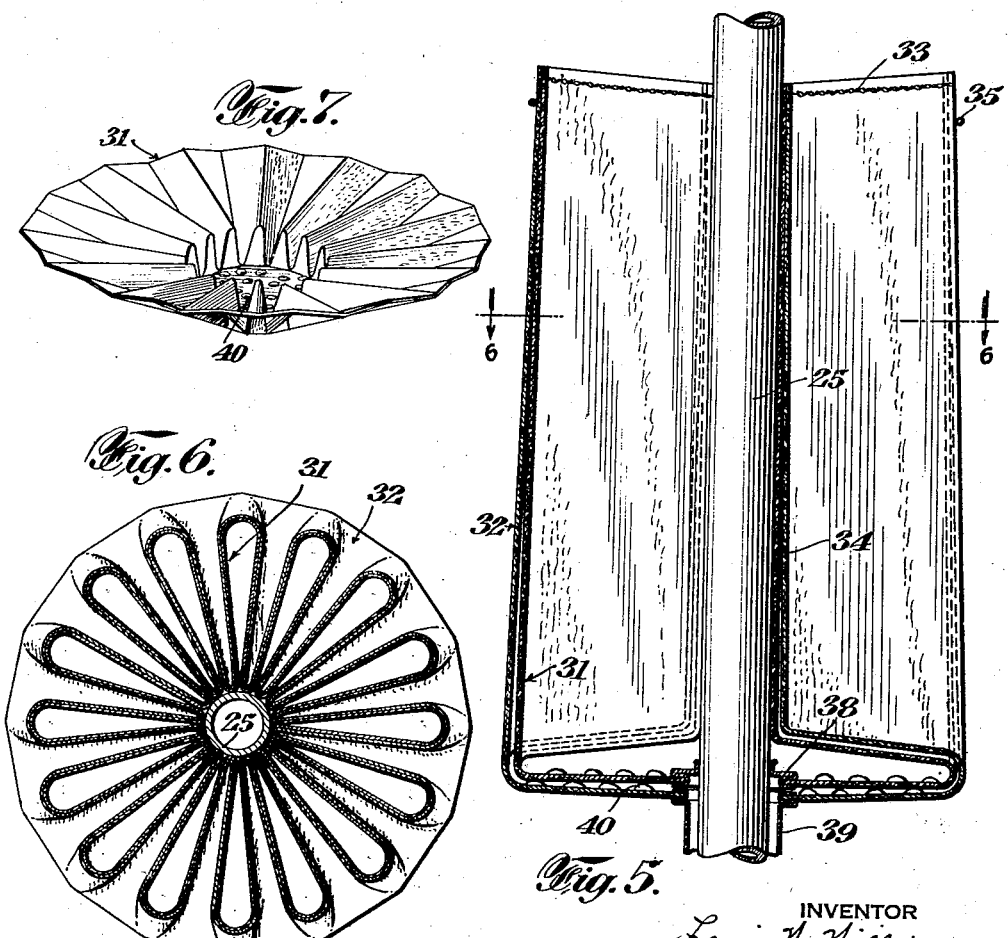
INVENTOR
Lewis W. Williams
BY
Kenyon & Kenyon
ATTORNEYS Patented Apr. 7, 1942

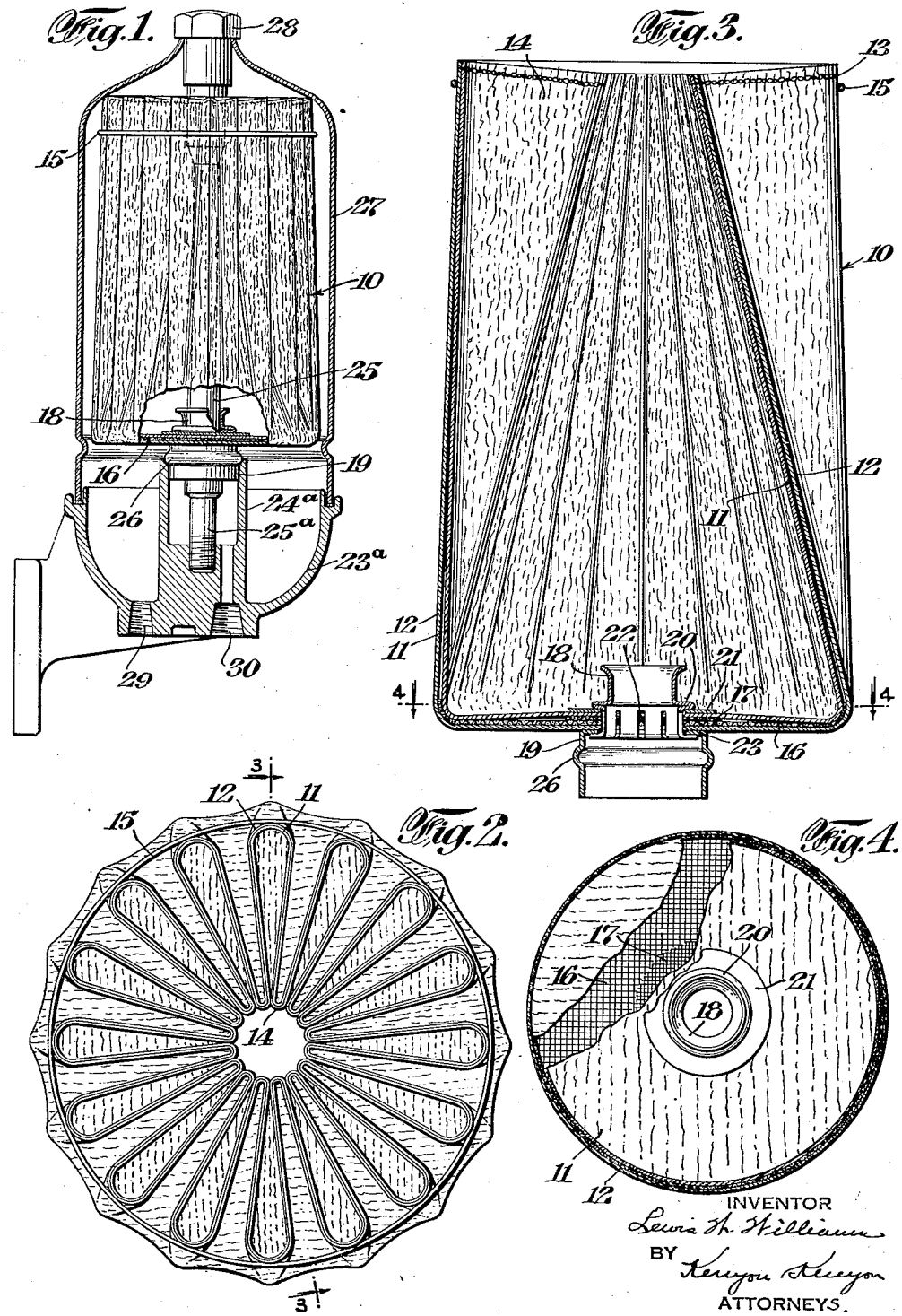

2,278,603

UNITED STATES PATENT OFFICE 2,278,603

FILTER

Lewis W. Williams, Short Hills, N. J., assignor to Motor Improvements, Inc., Newark N. J., a corporation of Delaware Application November 13, 1939, Serial No. 303,934

11 Claims. (Cl. 210—185)

This invention relates to filters and more especially to filters for use with automotive internal combustion engines.

An object of this invention is a highly efficient filtering element which is simple in structure, has a large effective surface area in a small space, is inexpensive to manufacture and has a long useful life.

In its preferred embodiment, an element according to the present invention comprises two similar sections of irregular or rough surface filtering medium connected at their edges and arranged with their opposing rough surfaces in contact over at least the major portion thereof. The element is of the outside-in type and passages are provided for draining filtered oil from the interior thereof. In part at least, the element is shaped to be of cylindrical configuration having inwardly projecting folds. The two element sections may be disks cut out from a sheet of kraft paper impregnated with a phenol-formaldehyde resin such, for example, as Bakelite, or may be circular members molded from paper pulp containing a phenol-formaldehyde resin. When the element is fabricated from two paper disks, such disks are first attached together along their peripheries and then are folded into the desired shape and provided with drainage means. When the element is fabricated from molded members, such members are originally formed of such shape that they have incipient folds but may be nested together, in which condition they are attached at their peripheries. While still plastic after the two members are attached together in their original shape, they are formed into the final shape of the element and heat treated to set them in such final shape.

Other objects, novel features and advantages of this invention will become apparent from the following specification and accompanying drawings, wherein:

Fig. 1 is a vertical section through a filter equipped with a filtering unit embodying the invention, such unit being partially broken away;

Fig. 2 is a top view of a filter unit embodying the invention;

Fig. 3 is a vertical section substantially on the line 3—3 of Fig. 2;

Fig. 4 is a section on the line 4—4 of Fig. 3;

Fig. 5 is a section similar to Fig. 3 of a modification;

Fig. 6 is a section on the line 6—6 of Fig. 5;

Fig. 7 is a perspective view of a molded paper member used in forming the filter illustrated in Fig. 5, and Fig. 8 illustrates a pair of molded members about to be assembled to produce the filter of Fig. 5.

The filtering element illustrated in Figs. 1 to 4 inclusive consists essentially of two disks 11 and 12 of irregular or rough surface filtering medium such, for example, as kraft paper connected at their peripheries preferably by a row of stitches 13. The two disks are shaped to form an element which is of substantially cup-shape in overall configuration with the cylindrical portion having inwardly projecting folds 14. The inner edges of the folds define the outline of a cone and the depth of the folds increases progressively upwardly. A wire ring 15 surrounds the upper end of the cylindrical portion of the filtering element and serves to prevent spreading of the upper end of such portion.

Two wire mesh disks 16 and 17 are arranged between the disks 11 and 12 in the bottom portion of the element, the disk 16 being of slightly greater area than the said bottom portion and having its edge turned to extend into the cylindrical portion and the disk 17 being not over half the area of the bottom portion. The disks 11, 12, 16 and 17 are provided with alined apertures through which extends a drainage tube composed of the bushings 18 and 19. The bushing 18 is provided with an outer rib 20 which engages a washer 21 arranged on the upper face of the disk 11. One end of the bushing 18 passes through the disks and is equipped with a plurality of slots 22 and the ends of the tongues thus formed are bent over an inwardly projecting flange 23a on the bushing 19, thereby completing the assembly of the drainage tube and also clamping the drainage tube to the filtering element in liquid-tight relation. The other end of the bushing 18 is of less interior diameter than the slotted end and extends into the cylindrical portion of the element 10. The wire mesh disks 16 and 17 form a drainage member for leading liquid through the bottom portion of the element to the slits 22 which constitute the outlets for the element. The undulated portions of the disks 11 and 12 are in contact throughout substantially their entire areas and the irregular surfaces thereof form channels through which liquid may flow downwardly to the wire mesh drainage member.

In Fig. 1 is illustrated the filter unit above described mounted in a container. Such container comprises a base 23 having a hollow boss 24 in the bottom of which is screwed a vertical post 25. The filtering element 10 surrounds the post 25 with the lower end of the bushing 19 fitting into the upper end of the boss 24 and the upper end of the bushing 18 tightly fitting the post 25. A rib 26 on the bushing 19 engages the rim of the boss 24 to locate the bushing relative to the boss. A shell or cover 27 has its rim fitting into a groove in the base 23 and is held in assembled relation to the base by a nut 28 having an interiorly threaded stem screwed on to the top of the post 25.

In the base 23 is provided an inlet 29 communicating with the sump surrounding the boss 24 and an outlet 30 communicating with the interior of the boss 24. Oil to be filtered is supplied to the interior of the filter housing through the inlet 29 and fills the entire housing so that oil to be filtered comes into contact with the outer surfaces of both disks 11 and 12. The snug fit of the bushing 18 on the post 25 prevents flow of oil along the surface of the post into the interior of the boss 24. Oil passes inwardly through both disks 11 and 12 and flows therebetween to the apertures 22 through which it flows around the post 25 into the boss 24 and thence out through the outlet 30. The same pressure is exerted by the oil over the entire areas of the two disks 11 and 12 so that there is no tendency for compression together of two folds. The necessary spacing between the disks to permit oil flow is provided by the irregular surface of the disks and the drainage members in the lower portion of the unit.

In constructing the above-described element from kraft paper, two proper size disks are laid in contacting relation with the mesh disks 16 and 17 located between the paper disks centrally thereof. The wire mesh disks and the paper disks are interconnected by any suitable temporary fastening means and the edges of the two disks are then stitched together. Preferably, the two disks are so arranged that the grain of one disk is perpendicular to the grain of the other disk. The circular two-wall element is then converted into cup-shape by fashioning an annular section thereof perpendicular to the remainder and simultaneously inwardly projecting sections of the annular portions to produce a star-shaped arrangement. The drainage tube is assembled therewith by punching alined apertures centrally of the bottom portion, projecting the slotted end of the bushing 18 through such apertures and clamping the bushing 18 to the bushing 19 by turning the slotted end of the bushing 18 over the flange 23. When it is desired to attach the drainage tube after the element has been shaped as above described, the rim of the cylindrical portion may be spread out sufficiently to afford access to the bottom portion. Following the attachment of the drainage tube and the arrangement of the element in the star-shaped condition, the wire 15 is placed over the end of the cylindrical portion to maintain it in such condition. The element is now ready for mounting in the filter casing as shown in Fig. 1.

Fig. 5 illustrates a filtering element consisting of two members 31 and 32 formed of molded paper pulp. The two elements are connected together at their peripheries preferably by a row of stitches 33 and are shaped to form an element which is of substantially cup-shape in overall configuration with the cylindrical portion having inwardly projecting folds 34. The folds are of uniform depth and their inner edges define the outline of a cylinder just slightly larger than the diameter of the post 25. The wire ring 35 surrounds the upper end of the cylindrical portion of the filtering element and serves to prevent spreading thereof. The folds terminate above the bottom portion of the element and the bottom edges of such folds slope downwardly to the outer edge of the bottom portion of the element. A bushing 38 is provided centrally of the bottom portion of the member 31 and surrounds the tube 25 with a snug liquid-tight fit. Centrally of the bottom portion of the member 32 is provided a bushing 39 of larger diameter than the post 25 to provide a drainage passageway around such post.

The members 31 and 32 are originally molded in the shape shown in Fig. 7. The members are molded in this form to facilitate removal of them from the mold. With the member in the condition shown in Fig. 7, the inner edges of the folds 34 are substantially perpendicular to the center circular portion and such folds have a decreasing taper toward the edge of the member. After the members 31 and 32 are removed from the mold, they are suitably dried after which the bushings 38 and 39 are attached thereto. Next, a pair of members are nested together and are interconnected along their peripheries preferably by stitching. After being thus interconnected, the two members are formed into their final shape shown in Fig. 5, by the use of suitable dies and the ring 35 is put in place, after which the element is heat treated to set the members in their final position. Each of the members 31 and 32 is provided with a plurality of small protrusions 40 over the circular portions of such members and the protrusions on the member 32 effect spacing of the two members to facilitate flow of oil toward the outlet, the protrusions being formed in the members at the time the members are molded.

Preferably the material composing the two members 11 and 12 is impregnated with Bakelite or other similar polymerized resin having irreversible thermoplastic characteristics. The paper disks may be treated with a thermoplastic material in the manner disclosed in the patent to Wells, No. 2,103,572. Preferably, the paper pulp used to mold the members 31 and 32 has mixed therein a water soluble thermoplastic material which is cured at the time the elements are dried thereby impregnating the elements with such material.

In a typical filter unit embodying this invention, the members 11 and 12 are 15 inches in diameter and the outside diameter of the cylindrical portion of the unit is approximately 3½ inches, there being 16 inwardly projecting folds. Each of the members 11 and 12 is approximately .045 inch thick and is impregnated with Bakelite. The impregnation of the members 11 and 12 with Bakelite is such that the Bakelite content of the members is 18% by weight.

I claim:
1. A filtering element comprising two contacting disk-shaped layers of filtering material joined at their edges, a sheet of drainage material of smaller area than said layers between the said layers and arranged centrally thereof, an opening through the central part of said sheet and said layers, an apertured drainage tube passing through said opening, and means clamping the layers in contact with the drainage tube, the aperture in said tube communicating only with the space between the layers of filtering material in which said drainage sheet is enclosed, the outer edges of the layers of filtering material out of contact with the drainage sheet being folded so that the outer edges of the folds define an overall cylindrical structure perpendicular to the plane of that portion of the element coextensive with the drainage sheet.

2. A filtering element comprising two contacting disk-shaped layers of filtering material joined at their edges, a sheet of drainage material of smaller area than said layers between the said layers and arranged centrally thereof, an opening through the central part of said sheet and said layers, a tube passing through said opening and having a port communicating only with the space between the layers of filtering material in which said drainage sheet is enclosed, and flanges on said tube clamping together the inner edges of said sheet and said layers, the outer edges of the layers of filtering material out of contact with the drainage sheet being folded so that the outer edges of the folds define an overall cylindrical structure perpendicular to the plane of that portion of the element coextensive with the drainage sheet.

3. A filtering element comprising two contacting disk-shaped layers of filtering material joined at their edges, a sheet of drainage material of smaller area than said layers between the said layers and arranged centrally thereof, an opening through the central part of said sheet and said layers, a tube passing through said opening and having a port communicating only with the space between the layers of filtering material in which said drainage sheet is enclosed, and means clamping the layers in contact with said tube, the outer edges of the layers of filtering material out of contact with the drainage sheet being folded so that the outer edges of the fold define an overall cylindrical structure perpendicular to the plane of the drainage sheet and the depth of the inner portions of the folds progressively varies from one end to the other of said cylindrical structure.

4. A filtering element according to claim 1 characterized by the filtering layers consisting of self-supporting irregular surface resin-impregnated paper.

5. A filtering element according to claim 2 characterized by the filtering layers consisting of self-supporting irregular surface resin-impregnated paper.

6. A filtering element according to claim 3 characterized by filtering layers consisting of self-supporting irregular surface resin-impregnated paper.

7. A filtering element comprising two contacting disk-shaped layers of filtering material joined at their edges, means spacing said layers for drainage purposes over central areas of less extent than said layers, an opening through said areas and spacing means, a tube passing through said opening and having a port communicating only with the space between said central areas, and means clamping said layers in contact with said tube, the outer edges of said layers beyond said central areas being folded so that the outer edges of the folds define an overall cylindrical structure perpendicular to the plane of said central areas.

8. A filtering element according to claim 7 in which the depth of the inner portions of the folds progressively varies from one end to the other of the cylindrical structure.

9. A filtering element according to claim 7 characterized by the depth of the inner portions of the folds being substantially uniform from one end to the other of said cylindrical structure.

10. A filtering element according to claim 7 characterized by the filtering layers consisting of self-supporting irregular surface resin-impregnated paper.

11. A filtering element according to claim 7 characterized by the filtering layers consisting of self-supporting irregular surface resin-impregnated paper and the depth of the inner portions of the folds progressively varying from one end to the other of the cylindrical structure.

LEWIS W. WILLIAMS.